United States Patent
Chang et al.

(10) Patent No.: US 10,580,538 B2
(45) Date of Patent: Mar. 3, 2020

(54) APPARATUS FOR DETECTING POSITION OF CONTROL ROD

(71) Applicants: KEPCO ENGINEERING & CONSTRUCTION COMPANY, INC., Gyeongsangbuk-do (KR); KNU-INDUSTRY COOPERATION FOUNDATION, Gangwon-do (KR)

(72) Inventors: In Bae Chang, Seoul (KR); Dae Hee Lee, Daejeon (KR); Sang Gyoon Jang, Sejong-si (KR); Myoung Goo Lee, Daejeon (KR); Jin Seok Park, Daejeon (KR); Yong Tae Jang, Daejeon (KR); Chang Kyu Chung, Sejong-si (KR); Cheol Soo Maeng, Daejeon (KR)

(73) Assignees: KEPCO ENGINEERING & CONSTRUCTION COMPANY, INC., Gyeongsangbuk-Do (KR); KNU-INDUSTRY COOPERATION FOUNDATION, Gangwon-Do (KR)

( * ) Notice: Subject to any disclaimer, the term of this patent is extended or adjusted under 35 U.S.C. 154(b) by 336 days.

(21) Appl. No.: 15/198,379

(22) Filed: Jun. 30, 2016

(65) Prior Publication Data

US 2017/0004893 A1  Jan. 5, 2017

(30) Foreign Application Priority Data

Jul. 3, 2015  (KR) ......................... 10-2015-0095303

(51) Int. Cl.
*G21C 7/06* (2006.01)
*G21C 7/08* (2006.01)

(52) U.S. Cl.
CPC ...................... *G21C 7/08* (2013.01)

(58) Field of Classification Search
CPC ................................. G21C 17/10; G21C 7/08
USPC ......................................... 356/139.03–8, 617
See application file for complete search history.

(56) References Cited

U.S. PATENT DOCUMENTS

| 4,636,846 | A | * | 1/1987 | Villarreal | ........... G06K 7/10861 348/83 |
| 4,777,010 | A | * | 10/1988 | Sato | ......................... G21C 7/12 376/215 |
| 5,912,934 | A | * | 6/1999 | Acks | ....................... G21C 19/02 376/248 |

(Continued)

FOREIGN PATENT DOCUMENTS

| JP | 6-82596 A | 3/1994 |
| JP | 06-109889 A | 4/1994 |

(Continued)

OTHER PUBLICATIONS

English Machine Translation of Ogiwara et al., JPH06109889 (A) "Control Rod Position Detector", Apr. 22, 1994.*
Korean Notice of Allowance dated Oct. 27, 2016, 7 pages.

*Primary Examiner* — Marshall P O'Connor
(74) *Attorney, Agent, or Firm* — Nixon Peabody LLP; Jeffrey L. Costellia

(57) ABSTRACT

An apparatus for detecting a position of a control rod includes a control rod driving shaft having an outer circumferential surface on which position information is marked, a mirror configured to reflect the position information, and a detector configured to detect a position of the control rod driving shaft from the position information reflected from the mirror, when the control rod driving shaft moves vertically.

5 Claims, 5 Drawing Sheets

(56) References Cited

U.S. PATENT DOCUMENTS

| | | | | |
|---|---|---|---|---|
| 6,163,012 A | * | 12/2000 | Kimura | B23K 26/106 |
| | | | | 219/121.63 |
| 10,036,232 B2 | * | 7/2018 | DeWitt | E21B 7/14 |
| 2011/0317172 A1 | * | 12/2011 | Tamiya | G01B 11/0608 |
| | | | | 356/614 |
| 2012/0194824 A1 | * | 8/2012 | de Groot | G01B 9/02003 |
| | | | | 356/482 |

FOREIGN PATENT DOCUMENTS

| | | |
|---|---|---|
| JP | 2942328 B2 | 6/1999 |
| JP | 11-264890 A | 9/1999 |

\* cited by examiner

APPARATUS FOR DETECTING POSITION OF CONTROL ROD

CROSS-REFERENCE TO RELATED APPLICATION

This application claims the benefit of Korean Patent Application No. 10-2015-0095303, filed on Jul. 3, 2015, in the Korean Intellectual Property Office, the disclosure of which is incorporated herein in its entirety by reference.

BACKGROUND

1. Field

One or more embodiments relate to an apparatus for detecting a position of a control rod, and more particularly, to an apparatus for precisely and easily detecting a position of a control rod that moves vertically.

2. Description of the Related Art

In a pressurized water nuclear reactor, a control element drive mechanism (CEDM) adjusts a reactivity of a reactor core by controlling a control rod to move vertically in the reactor core according to a control signal. Accordingly, position information of the control rod is very important in designing a reactor core protection system. In particular, for stability and reliability of all devices mounted in an integrated nuclear reactor, a CEDM or a position indicator of a control rod has to operate in very harsh environmental conditions in the integrated nuclear reactor.

In a conventional nuclear reactor, a position indicator including a reed switch is used to detect a position of a control rod. In general, the control rod is coupled to a lower end portion of a control rod driving shaft and vertically moves in a reactor core at the same time as the control rod driving shaft moves vertically. The reed switch is turned on/off by a permanent magnet mounted on an upper end of the control rod driving shaft.

As shown in FIG. 1, a reed switch 1 used in a conventional position indicator includes one pair of flexible magnetic bodies hermetically sealed in a glass tube 2 filled with inert gas. The reed switch 1 operates so that mechanical contact points are generally separated from each other and contact each other only when a magnetic field formed by a permanent magnet mounted on an upper end of a control rod driving shaft is applied to the reed switch 1. A plurality of the reed switches 1 are arranged on a non-magnetic plate 3, and a circuit is formed by connecting each of the plurality of reed switches 1 to a resistor. A structure and an operation of the reed switch 1 are well known, and thus, a detailed explanation thereof will not be given.

When the conventional position indicator using the reed switch 1 is employed, since the reed switches 1 are aligned, a resolution equal to or less than a length of the reed switches 1 may not be obtained. Thus, it is difficult to obtain precise position information required by a small nuclear reactor that operates by using a load following method.

Also, in an integrated nuclear reactor, the inside of an upper pressure vessel is filled with high-temperature primary water. A lot of efforts and attempts to secure or develop permanent magnets and reed switches that may withstand such high temperature are necessary.

SUMMARY

One or more embodiments include an apparatus for detecting a position of a control rod by precisely and easily detecting position information of a control rod driving shaft.

Additional aspects will be set forth in part in the description which follows and, in part, will be apparent from the description, or may be learned by practice of the presented embodiments.

According to one or more embodiments, an apparatus for detecting a position of a control rod includes: a control rod driving shaft having an outer circumferential surface on which position information is marked; a mirror configured to reflect the position information; and a detector configured to detect a position of the control rod driving shaft from the position information reflected by the mirror, when the control rod driving shaft moves vertically.

The detector may include: an optical system including a lens configured to receive an image of the position information reflected from the mirror; an optical fiber connected to the optical system and configured to transmit the image; a storage unit configured to store the image transmitted from the optical fiber; and a display unit configured to display the image stored in the storage unit to the outside.

The mirror may be disposed along the outer circumferential surface of the control rod driving shaft.

The mirror may have a hollow truncated cone shape with a through-hole through which the control rod driving shaft passes.

A plurality of grooves for vertically moving the control rod driving shaft may be formed in the outer circumferential surface of the control rod driving shaft, and the position information may be formed between the grooves.

The apparatus may further include an optical connector configured to transmit the image to the outside of a nuclear reactor.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
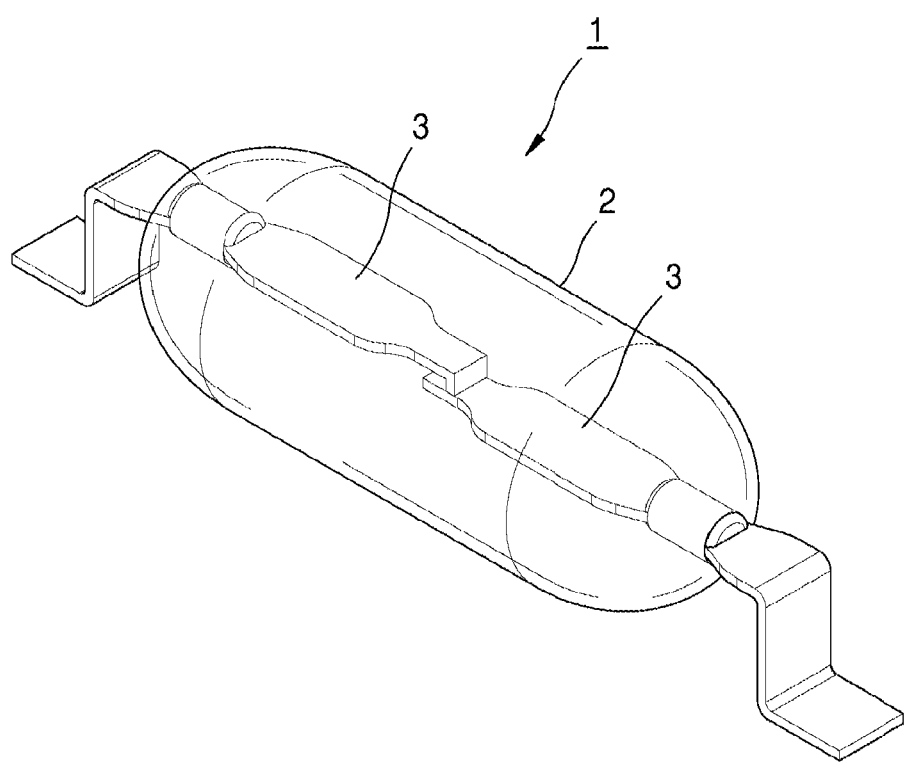
FIG. 1 is an image of a conventional reed switch.

The inventive concept now will be described more fully hereinafter with reference to the accompanying drawings, in which elements are shown. The inventive concept may, however, be embodied in many different forms and should not be construed as limited to the exemplary embodiments set forth herein. Rather, these embodiments are provided so that this disclosure will be thorough and complete, and will fully convey the scope of the inventive concept to one of ordinary skill in the art. The technical scope of the inventive concept is defined by the accompanying claims. Throughout the specification, the same reference numerals denote the same elements.

The terminology used herein is for the purpose of describing embodiments only and is not intended to be limiting of embodiments. As used herein, the singular forms "a", "an", and "the" are intended to include the plural forms as well, unless the context clearly indicates otherwise. It will be further understood that the terms "comprises" and/or "comprising" used herein specify the presence of stated members, but do not preclude the presence or addition of one or more other members.

Unless otherwise defined, all terms (including technical and scientific terms) used herein have the same meaning as commonly understood by one of ordinary skill in the art to which embodiments belong.

A direction mentioned to describe a structure in an embodiment is based on that in the drawings. When a reference point in a direction and a position relationship are not clearly mentioned, related drawings should be referred to.

The inventive concept relates to an apparatus for detecting a position of a control rod. In particular, the apparatus according to the inventive concept may be applied to a small and medium-sized nuclear reactor in which it is crucial to precisely detect a position of a control rod according to reactor characteristics.

As used herein, the term "and/or" includes any and all combinations of one or more of the associated listed items.

The inventive concept will now be described more fully with reference to the accompanying drawings, in which embodiments are shown.

Figure 2:
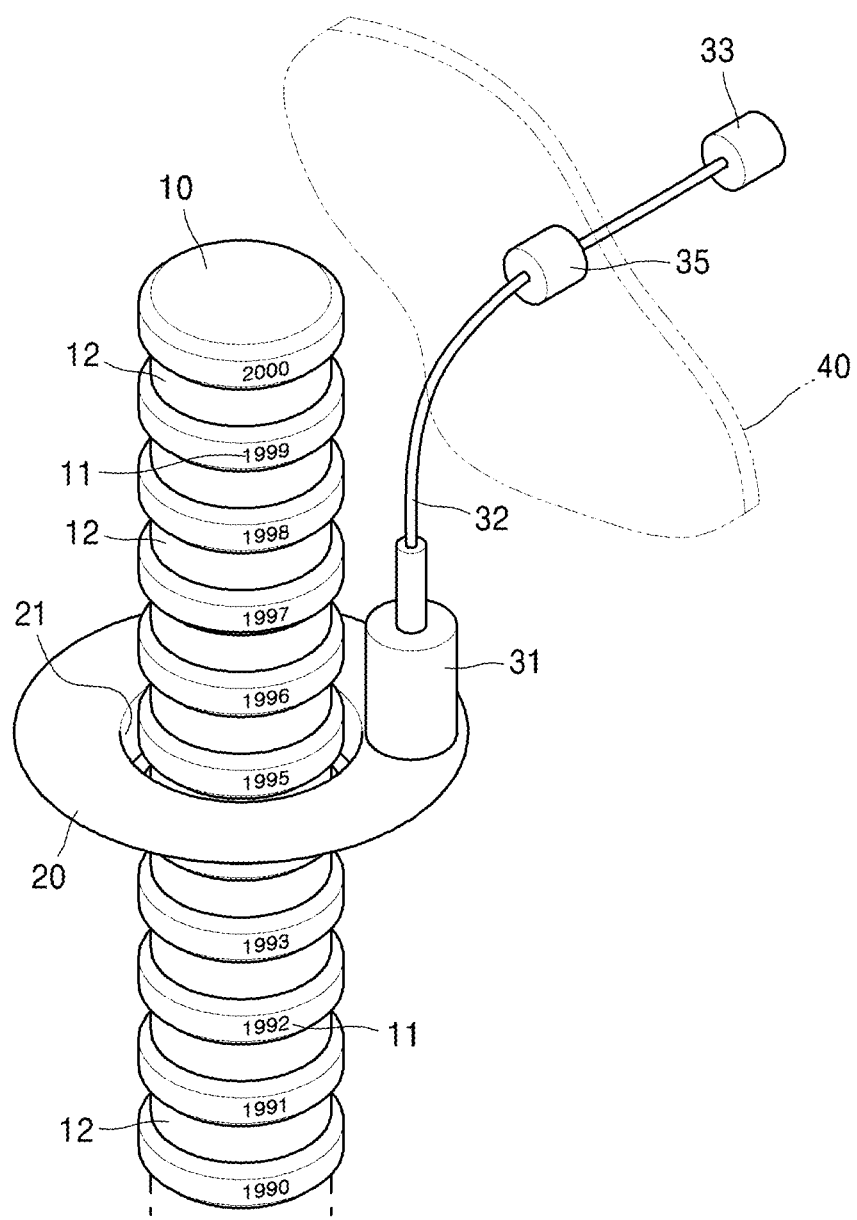
FIG. 2 is a perspective view of an apparatus for detecting a position of a control rod according to an embodiment.
Figure 3:
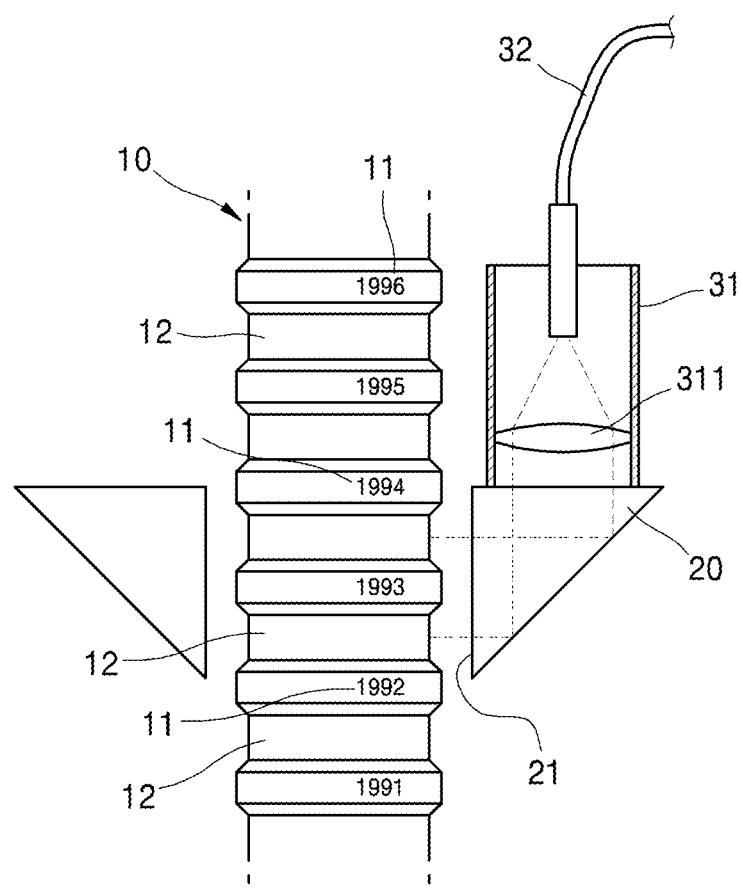
FIG. 3 is a side view of FIG. 2.
Figure 4:
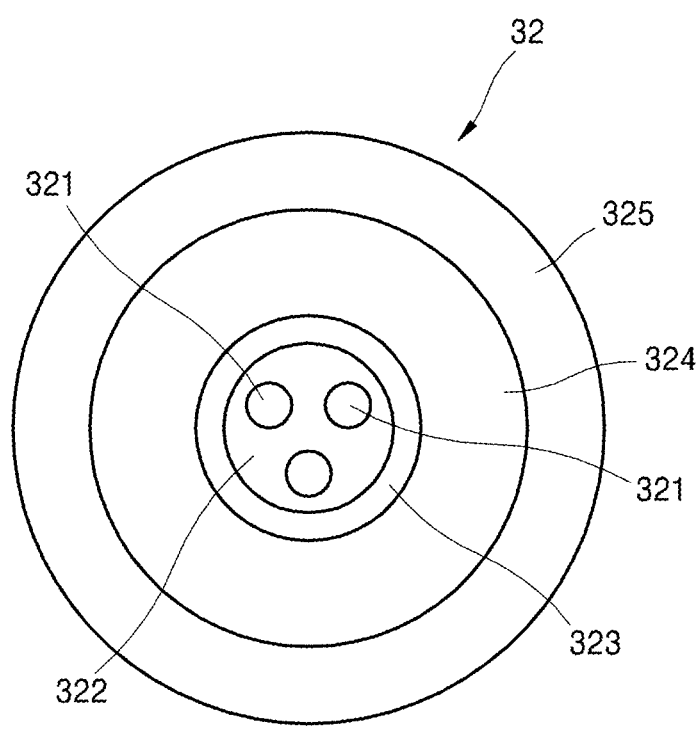
FIG. 4 is a cross-sectional view of a optical fiber employed by according to an embodiment of the inventive concept.
Figure 5:
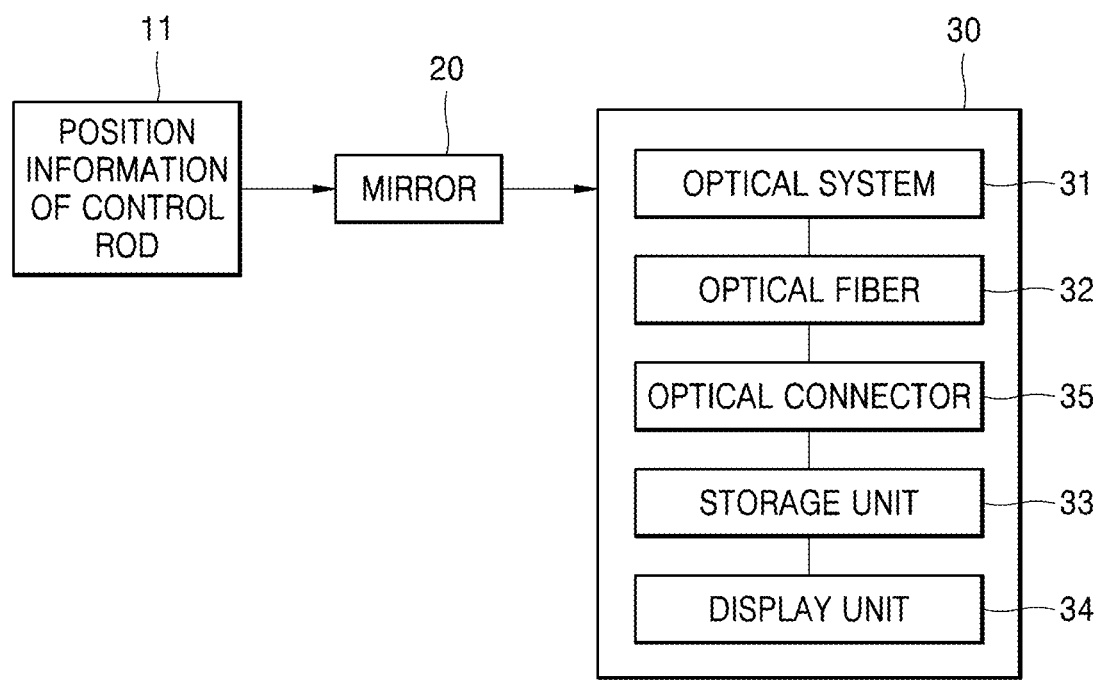
FIG. 5 is a block diagram of an apparatus for detecting a position of a control rod according to an embodiment.
Figure 6:
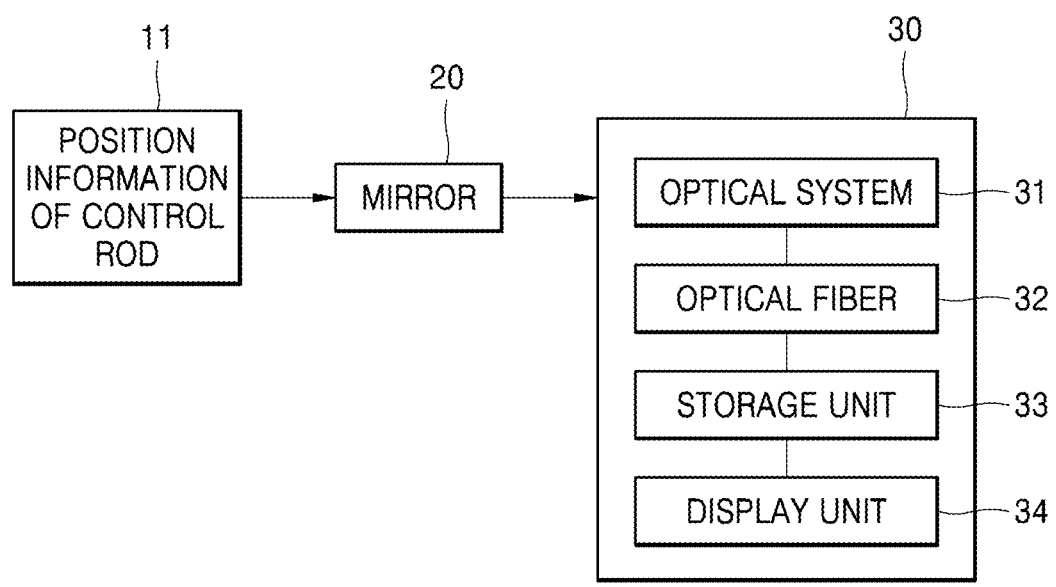
FIG. 6 is a block diagram of an apparatus for detecting a position of a control rod according to another embodiment.

FIG. 3 is a side view of FIG. 2. FIG. 4 is a cross-sectional view of a optical fiber 32 employed by according to an embodiment of the inventive concept. FIG. 5 is a block diagram of an apparatus for detecting a position of a control rod according to an embodiment. FIG. 6 is a block diagram of an apparatus for detecting a position of a control rod according to another embodiment.

As shown in FIG. 3, an apparatus for detecting a position of a control rod (referred to as the apparatus) according to an embodiment includes a control rod driving shaft 10, a mirror 20, and a detector 30.

The control rod driving shaft 10 is configured to insert or remove a control rod into or from a reactor core in order to control an output of a nuclear reactor, and position information 11 is marked on an outer circumferential surface of the control rod driving shaft 10. The position information 11 may be marked as a number or a bar code in order to determine an absolute position of the control rod driving shaft 10. However, a display type of the position information 11 is not limited thereto. Since the control rod is coupled to a lower end of the control rod driving shaft 10 and moves along with the control rod driving shaft 10, when a position of the control rod driving shaft 10 is accurately detected, it also means that a position of the control rod is accurately detected.

According to the present embodiment, a plurality of grooves 12 are formed in the outer circumferential surface of the control rod driving shaft 10 in order to vertically move the control rod driving shaft 10. The position information 11 is formed between the grooves 12.

The apparatus according to the present embodiment may be applied to a control rod driving device for vertically moving the control rod driving shaft 10 by using a magnetic jack. The control rod driving device using the magnetic jack may be a 4-coil control rod driving device provided with four coils. In detail, the 4-coil control rod driving device includes an upper lift (UL) coil, an upper gripper (UG) coil, a lower lift (LL) coil, and a lower gripper (LG) coil.

The 4-coil control rod driving device controls a vertical movement of the control rod driving shaft 10 by controlling a magnetic force generated from the four coils. In this case, the grooves 12 are formed in the outer circumferential surface of the control rod driving shaft 10, and the 4-coil control rod driving device controls a vertical movement of the control rod driving shaft 10 by causing a latch to be inserted into or removed from any of the grooves 12. The 4-coil control rod driving device moves the latch by controlling a magnetic force generated from the four coils. The magnetic jack is well known and is not directly related to the inventive concept, and thus a detailed explanation thereof will not be given.

Since the position information 11 is formed between the grooves 12 of the control rod driving shaft 10, when the control rod driving shaft 10 is moved by using the magnetic jack or the like, the position information 11 is not damaged. Even when the position information 11 is slightly damaged while the apparatus is continuously used, loss of the position information 11 due to abrasion during use may be prevented by continuously tracking damaged image information by using an image analysis technique.

The mirror 20 is provided in order to reflect the position information 11. According to the present embodiment, the mirror 20 is disposed along the outer circumferential surface of the control rod driving shaft 10. In detail, as shown in FIGS. 2 and 3, the mirror 20 is formed to have a hollow truncated cone shape having a through-hole 21 through which the control rod driving shaft 10 may pass.

In detail, the mirror 20 according to the present embodiment is formed to have a right triangular prism-like cross-section and is formed of quartz, and an inclined plane of the mirror 20 is silver-plated. It is preferable that the mirror 20 is formed of quartz in order to be used at a high temperature and a high pressure in the nuclear reactor. The inclined plane of the mirror 20 having the right triangular prism-like cross-section is disposed to reflect the position information 11 to the detector 30.

Since the mirror 20 has a ring shape to surround the control rod driving shaft 10, a wide field of view may be obtained as if a fisheye lens is used. An outer surface of the control rod driving shaft 10 may be widely and easily observed even in a narrow space of the nuclear reactor. However, a shape of the mirror 20 is not limited thereto. For example, the mirror 20 may be a flat mirror having a prism-like cross-section that does not surround the control rod driving shaft 10 at a position corresponding to the position information 11.

When the control rod driving shaft 10 moves upward or downward, the detector 30 detects a position of the control rod driving shaft 10 from the position information 11 reflected from the mirror 20. In detail, the detector 30 includes an optical system 31, an optical fiber 32, a storage unit 33, and a display unit 34.

The optical system 31 includes a lens 311 configured to receive an image of the position information 11 reflected from the mirror 20. The optical system 31 is coupled to the mirror 20. The optical system 31 may be a well-known fiberscope. Although only one optical system 31 is provided in FIGS. 2 and 3, the number of the optical systems 31 is not limited thereto.

For example, when two mirrors 20 are disposed to be symmetric with each other about the control rod driving shaft 10, the optical system 31 may be provided on each of the mirrors 20. In this case, one optical system 31 may be used to detect a position of the control rod driving shaft 10 and the remaining optical system 31 may be used as a backup system. The remaining optical system 31 may also be used as a unit for observing a degree of damage to the outer surface of the control rod driving shaft 10.

The optical fiber 32 is connected to the optical system 31 and transmits the image of the position information 11. The optical fiber 32 according to the present embodiment is an optical fiber that may be used at a high temperature and a high pressure.

In detail, as shown in FIG. 4, an inner fiber 321 is surrounded and protected by a high-temperature gel 322, an inner stainless tube 323, an aluminum tube 324, and an outer stainless tube 325. Since the optical fiber 32 may be used at a temperature equal to or higher than 300° C. and a pressure equal to or higher than 20000 psi (e.g., 1400 bar), the optical fiber 32 may be used in an integrated nuclear reactor.

The storage unit 33 stores the image transmitted from the optical fiber 32. For example, the storage unit 33 may include a charge-coupled device (CCD) camera.

The display unit 34 displays the image stored in the storage unit 33 to the outside. The display unit 34 may be provided so that an operator outside the nuclear reactor may observe the image.

The detector 30 according to the present embodiment may further include an optical connector 35. The optical connector 35 is configured to transmit the image of the position information 11 to the outside of the nuclear reactor. As shown in FIG. 2, the optical connector 35 may be coupled to a nuclear reactor head 40.

As such, since the apparatus according to the inventive concept detects an actual position of the control rod driving shaft 10 by obtaining an image of the position information 11 marked on the outer circumferential surface of the control rod driving shaft 10, the apparatus may precisely and easily obtain a position of the control rod driving shaft 10.

That is, while a conventional method using a reed switch is difficult to precisely detect a position due to a resolution limitation, the apparatus according to the inventive concept detects a position of the control rod driving shaft 10 by using an optical image, and thus may have a very high resolution. Accordingly, the apparatus according to the inventive concept may be applied to a small and medium-sized nuclear reactor in which it is crucial to precisely detect a position of the control rod driving shaft 10.

Also, since an image of the inside of the nuclear reactor may be observed in real time, a degree of abrasion of the outer surface of the control rod driving shaft 10 may be monitored.

The apparatus according to the one or more embodiment may precisely and easily detect a position of a control rod. Since the apparatus uses an image processing technique for detecting a position by using an optical image, a very high resolution may be ensured.

Also, since the apparatus may observe an image of a control rod driving shaft in a nuclear reactor in real time, damage to or abrasion of an outer surface of the control rod driving shaft may be continuously monitored.

While one or more embodiments have been described with reference to the figures, it will be understood by those of ordinary skill in the art that various changes in form and details may be made therein without departing from the spirit and scope of the inventive concept as defined by the following claims.

What is claimed is:

1. An apparatus for detecting a position of a control rod, the apparatus comprising:
    a control rod driving shaft having an outer circumferential surface on which position information is marked;
    a mirror configured to reflect the position information; and
    a detector configured to detect a position of the control rod driving shaft from the position information reflected by the mirror, when the control rod driving shaft moves vertically,
    wherein the mirror is disposed to surround the control rod driving shaft along the outer circumferential surface of the control rod driving shaft and is formed of quartz and has a ring shape,
    the position information is marked as a number or a bar code in order to determine an absolute position of the control rod driving shaft,
    the detector comprises:
        an optical system comprising a lens configured to receive an image of the position information reflected from the mirror;
        an optical fiber connected to the optical system and configured to transmit the image,
        the optical fiber comprises an inner fiber surrounded and protected by a high-temperature gel, an inner stainless tube, an aluminum tube, and an outer stainless tube, sequentially.

2. The apparatus of claim 1, wherein the detector comprises:
    a storage unit configured to store the image transmitted from the optical fiber; and
    a display unit configured to display the image stored in the storage unit to the outside of a nuclear reactor.

3. The apparatus of claim 1, wherein the mirror has a hollow truncated cone shape with a through-hole through which the control rod driving shaft passes.

4. The apparatus of claim 1, wherein a plurality of grooves for vertically moving the control rod driving shaft are formed in the outer circumferential surface of the control rod driving shaft, and the position information is formed between the grooves.

5. The apparatus of claim 2, further comprising an optical connector configured to transmit the image to the outside of the nuclear reactor.

* * * * *